United States Patent
Gunzelmann et al.

(10) Patent No.: US 6,643,344 B2
(45) Date of Patent: Nov. 4, 2003

(54) TRACKING METHOD AND CONFIGURATION FOR CARRYING OUT THE METHOD

(75) Inventors: Bertram Gunzelmann, Augsburg (DE); Arkadi Molev-Shteiman, Bnei Brak (IL)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/794,665

(22) Filed: Feb. 27, 2001

(65) Prior Publication Data

US 2001/0033605 A1 Oct. 25, 2001

Related U.S. Application Data

(63) Continuation of application No. PCT/DE99/02697, filed on Aug. 27, 1999.

(30) Foreign Application Priority Data

Aug. 27, 1998 (DE) .......................... 198 39 018

(51) Int. Cl.$^7$ .......................... H04B 15/00; H04K 1/00; H04L 27/30
(52) U.S. Cl. .................. 375/367; 370/515; 375/150
(58) Field of Search ................. 375/367, 149, 375/148, 150, 130, 136, 140, 142, 145, 147; 370/503, 515

(56) References Cited

U.S. PATENT DOCUMENTS 4,785,463 A * 11/1988 Janc et al. .................. 375/147
5,398,034 A * 3/1995 Spilker, Jr. .................. 342/357
5,414,729 A * 5/1995 Fenton ........................ 375/149
5,495,499 A * 2/1996 Fenton et al. ............... 375/205
5,724,046 A * 3/1998 Martin et al. ............... 342/185
5,734,674 A * 3/1998 Fenton et al. ............... 375/207
5,815,539 A * 9/1998 Lennen ....................... 375/371
5,910,948 A * 6/1999 Shou et al. .................. 370/335
6,078,611 A * 6/2000 La Rosa et al. ............ 375/206
6,188,679 B1 * 2/2001 Sato ........................... 370/335
6,289,040 B1 * 9/2001 Molev-Shteiman ......... 375/149

FOREIGN PATENT DOCUMENTS

DE          37 43 731 C2     7/1989
WO       WO 97/06446     2/1997

* cited by examiner

Primary Examiner—Jean Corrielus
(74) Attorney, Agent, or Firm—Laurence A. Greenberg; Werner H. Stemer; Ralph E. Locher

(57) ABSTRACT

A method for tracking a locally generated spread spectrum signal sequence includes the step of correcting the spread spectrum signal sequences with respect to the synchronization time in an early/late interval. The correlation responses are subtracted from one another and the clock of the locally generated spread spectrum signal sequence is controlled as a function of the subtraction. Correlations are performed through the use of at least two hierarchically staggered closed-loop controls having different early/late intervals. The early interval of the one closed-loop control having a small early/late interval must not become earlier than the early interval of the other closed-loop control system having a next-larger early/late interval. Furthermore, the late intervals of the one closed-loop control system having a small early/late interval must not become later than the late interval of the other closed-loop control system having a next-larger early/late interval. A configuration for tracking a spread spectrum signal sequence is also provided.

12 Claims, 4 Drawing Sheets

TRACKING METHOD AND CONFIGURATION FOR CARRYING OUT THE METHOD

CROSS-REFERENCE TO RELATED APPLICATION

This application is a continuation of copending International Application No. PCT/DE99/02697, filed Aug. 27, 1999, which designated the United States.

BACKGROUND OF THE INVENTION

FIELD OF THE INVENTION

The invention relates to a method for tracking a locally generated spread spectrum signal sequence in order to synchronize the locally generated spread spectrum signal sequence with a corresponding received spread spectrum signal sequence. The invention also relates to a configuration for tracking a locally generated spread spectrum signal sequence.

The method according to the invention can be used with basic spread spectrum methods, such as direct sequence methods. In these methods, a message is modulated with a higher-frequency pseudo-random binary sequence before being transmitted. The receiver can extract the message from the pseudo noise signal produced if the receiver knows the binary sequence.

These methods are used in data communications, position finding and navigation. An important field of use is, e.g. the real-time satellite navigation according to the NAVSTAR GPS system (Navigation System with Timing And Ranging, Global Positioning System), which is described, e.g. by Schrödter, in "GPS Satellite Navigation," Franzis Verlag, Munich, 1994. For a receiver to be able to identify a transmitter and evaluate its information, it must know a transmitter-specific code (gold code) which is transmitted as a periodic signal sequence of predetermined length. In order to make the code available, all the codes of the transmitters in question are stored in the receiver. Since, furthermore the phase angle of each incoming signal is not known, the match between the received spread spectrum signal sequence and the locally generated spread spectrum signal sequence is established in an acquisition method. The comparison is performed by the correlation function of the signal which becomes almost one when there is synchronization.

Since the transmitter and the receiver are moving relative to one another, the synchronization must be subsequently maintained by correcting the phase of the locally generated spread spectrum signal sequence to the received spread spectrum signal sequence. This is done by regulating the clock of the locally generated spread spectrum signal sequence as a function of the phase deviation found.

It is known to use a so-called delay locked loop (DLL) for this purpose as is described, for example, in Holmes: Coherent Spread Spectrum Systems, Robert E. Krieger, 1990. This method is based on the locally generated spread spectrum signal sequence being phase shifted by the same amount preceding and following the expected punctual times and the received spread spectrum signal sequence being correlated with the spread spectrum signal sequences of this earlier and later time. The results are then subtracted from one another in order to receive the final correlation result.

In this method, it is found that a small phase shift is advantageous to the control characteristic with respect to the noise but that it is disadvantageous in a multiplicity of operating conditions when a good correction of the locally generated spread spectrum signal sequence is to be achieved. The smaller the early/late interval of the closed-loop control, the poorer becomes the dynamic behavior because the tracking can be lost with fast and sudden movements.

In U.S. Pat. No. 5,734,674 to Fenton et al., a method for synchronizing a locally generated spread spectrum signal sequence with a corresponding received spread spectrum signal sequence is described. In this method, a large early/late interval is initially used which covers a large capture range.

In the course of the closed-loop control, this large early/late interval is narrowed down. The actual signal tracking is then done with a small early/late interval. In a very dynamic scenario or with a very noisy initial signal, the closed-loop control may, therefore, lose lock.

SUMMARY OF THE INVENTION

It is accordingly an object of the invention to provide a method and a configuration for tracking which overcome the above-mentioned disadvantages of the heretofore-known methods and configurations of this general type and which improve the dynamic behavior and, at the same time improve a variance of the distributed results.

With the foregoing and other objects in view there is provided, in accordance with the invention, a method of tracking a locally generated spread spectrum signal sequence, the method includes the steps of:

correlating a received spread spectrum signal sequence with a locally generated spread spectrum signal sequence with respect to a synchronization time at a relatively earlier time and a relatively later time in an early/late interval;

subtracting correlation responses from one another;

controlling a clock of the locally generated spread spectrum signal sequence as a function of a result of the subtracting step for synchronizing the locally generated spread spectrum signal sequence with a received spread spectrum signal sequence corresponding to the locally generated spread spectrum signal sequence;

performing correlations based on at least two hierarchically staggered closed-loop controls with different early/late intervals;

providing an early interval of a first one of the at least two hierarchically staggered closed-loop controls having a relatively smaller early/late interval such that the early interval of the first one of the at least two hierarchically staggered closed-loop controls does not become earlier than an early interval of a second one of the at least two hierarchically staggered closed-loop controls having a relatively next-larger early/late interval; and providing a late interval of the first one of the at least two hierarchically staggered closed-loop controls such that the late interval of the first one of the at least two hierarchically staggered closed-loop controls does not become later than a late interval of the second one of the at least two hierarchically staggered closed-loop controls.

In other words, the object of the invention is achieved by a method for correlating a locally generated spread spectrum signal sequence for synchronization with a corresponding received spread spectrum signal sequence, wherein the latter is correlated with the locally generated spread spectrum signal sequence with respect to the synchronization time at an earlier and a later time in an early/late interval, the correlation responses are subtracted from one another and the clock of the locally generated spread spectrum signal sequence is controlled as a function of the result of the subtraction, wherein correlations are performed through the use of at least two hierarchically staggered closed-loop controls with different early/late intervals and in that the early interval of one closed-loop control having a small early/late interval must not become earlier than the early interval of the other closed-loop control having a next-larger early/late interval and, furthermore, the late intervals of the one closed-loop control having a small early/late interval must not become later than the late interval of the other closed-loop control having a next-larger early/late interval.

According to another mode of the invention, the correlations are performed by starting with a largest one of the early/late intervals; and the correlations are performed with a given one of the early/late intervals smaller than the largest one of the early/late intervals subsequent to reaching a control limit of the largest one of the early/late intervals.

According to yet another mode of the invention, an early time and a late time of a given one of the at least two hierarchically staggered closed-loop controls having a smallest one of the early/late intervals are used for calculating a punctual time.

With the objects of the invention in view there is also provided, a configuration for tracking a locally generated spread spectrum signal sequence, including:

a delay locked loop configuration including filter devices, the delay locked loop configuration comparing locally generated early spread spectrum signal sequences, locally generated punctual spread spectrum signal sequences and locally generated late spread spectrum signal sequences with a received spread spectrum signal sequence;

the filter devices phase-shifting the locally generated early spread spectrum signal sequences and the locally generated late spread spectrum signal sequences with respect to the locally generated punctual spread spectrum signal sequences;

at least two control loops having different early/late intervals and having respective inputs, the at least two control loops being connected in parallel at the respective inputs;

the at least two control loops including a first control loop and a second control loop, the first control loop having a first output and having a relatively smaller early/late interval, the second control loop having a second output and having a relatively next-larger early/late interval;

a comparator, connected to the first output and to the second output, for comparing output signals from the first control loop and the second control loop; and a data processing unit connected to the comparator.

In other words, the object of the invention is achieved by a DLL configuration which performs the method according to the invention wherein at least two control loops having different early/late intervals are connected in parallel at their respective inputs, wherein the output of a control loop having a smaller early/late interval and the output of the control loop having the in each case next-larger early/late interval are connected to a comparator which compares the output signals of these two control loops, and wherein all comparators are connected to a data processing unit which ensures, based on the output signals of all control loops, that the associated limit values of the early/late intervals are not exceeded.

Accordingly, a basic concept of the invention is based on the idea of allowing a number of DLL configurations to act together in a hierarchical structure. The individual closed-loop controls have phase shifts in such a manner that they are interleaved and initially the closed-loop control having the largest early/late interval is operated. When changing over to the DLL with the next smaller early/late interval, the closed-loop control must only be within the limit values of the DLL having the next-larger early/late interval etc. Graphically expressed, the method can be compared with carriages which are nested together where a smaller carriage can in each case move on the larger carriage. The smallest carriage makes its own movement, on the one hand and, on the other hand, it also participates in the movements of the other carriages when it reaches the limit of its own range of movement.

The invention has the advantage that two fundamentally incompatible conditions can be met, namely good noise suppression, on the one hand, and good dynamic behavior, on the other hand.

It is especially advantageous if there are four control loops. This makes it possible to achieve a particularly good suppression of the variance in spread.

According to another feature of the invention, further comparators are connected to respective pairs of the control loops.

According to yet another feature of the invention, the at least two control loops are second-order control loops.

According to a further feature of the invention, the first control loop and the second control loop are configured such that a relation $\Delta_k \geq \Delta_{k-1}/2$ is met, where $2\Delta_k$ is the relatively smaller early/late interval and $2\Delta_{k-1}$ is the relatively next-larger early/late interval.

According to another feature of the invention, a given one of the at least two control loops has a relatively largest early/late interval such that a relation $2\Delta_1 = T_c$ is met where $2\Delta_1$ is the relatively largest early/late interval and $T_c$ is a chip period of one of the spread spectrum signal sequences.

Other features which are considered as characteristic for the invention are set forth in the appended claims.

Although the invention is illustrated and described herein as embodied in a tracking method and a configuration for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
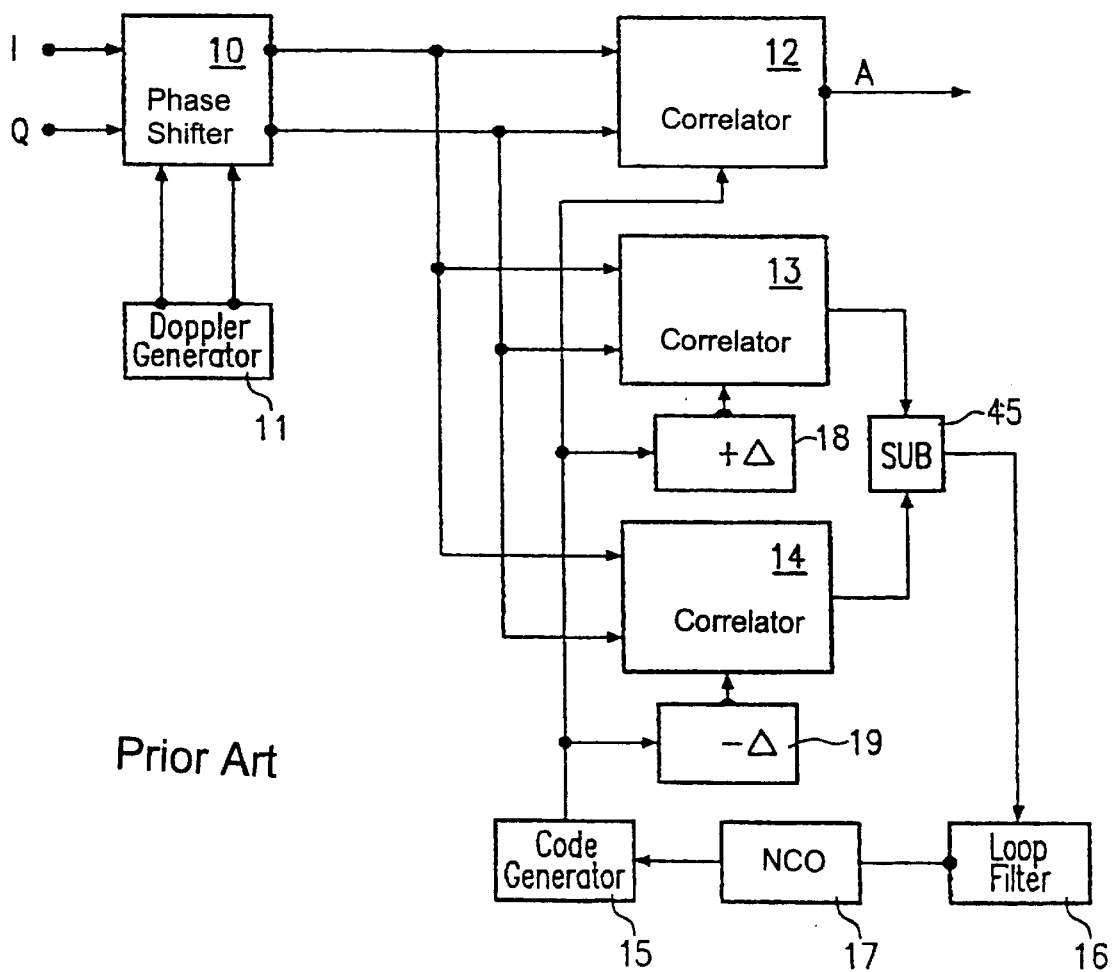
FIG. 1 is a block diagram of a conventional control loop (DLL)

Referring now to the figures of the drawings in detail and first, particularly, to FIG. 1 thereof, there is shown how a total received signal coming as spread spectrum signal sequence from an antenna is mixed into the base band with the aid of a quadrature demodulator, the signal also being shifted by the Doppler frequency.

The signals are supplied to a phase shifter 10 which is influenced by a Doppler generator 11. The phase shifter 10 eliminates the shift in the receiver signal caused by the Doppler frequency. The outputs of the phase shifter 10 pass in parallel to three correlators 12, 13 and 14 in which the gold code of the relevant transmitter is in each case found in a known manner in the noise level of the total signal. For this purpose, a code generator 15 supplies all three correlators 12, 13 and 14 with the gold codes to be considered in the search.

The clock of the code generator 15 is determined from the output of a loop filter 16 via a numerically controlled oscillator (NCO) 17.

The first correlator 12 is synchronously supplied with the spread spectrum signal sequence generated by the code generator 15, i.e. it operates synchronously with respect to the locally generated spread spectrum signal sequence and thus correlates the received spread spectrum signal sequence with a locally generated "punctual" spread spectrum signal sequence. The result of the correlation of the synchronized spread spectrum signal sequences can be picked up at its output A.

In the second and third correlator 13, 14, the received spread spectrum signal sequence is correlated with two phase-shifted locally generated spread spectrum signal sequences in that the output of the code generator 15 is supplied to the second correlator 13 via a first phase shifter 18 having a leading phase +Δ. The third correlator 14 receives the lagging, locally generated spread spectrum signal sequence via a second phase shifter 19 with the phase shift −Δ. The absolute value of this early/late interval 2Δ with respect to the synchronization time is typically one chip period Tc.

The correlation responses of the second and third correlator 13, 14 are subtracted in a subtractor 45, the output of which is supplied to the loop filter 16.

Figure 2:
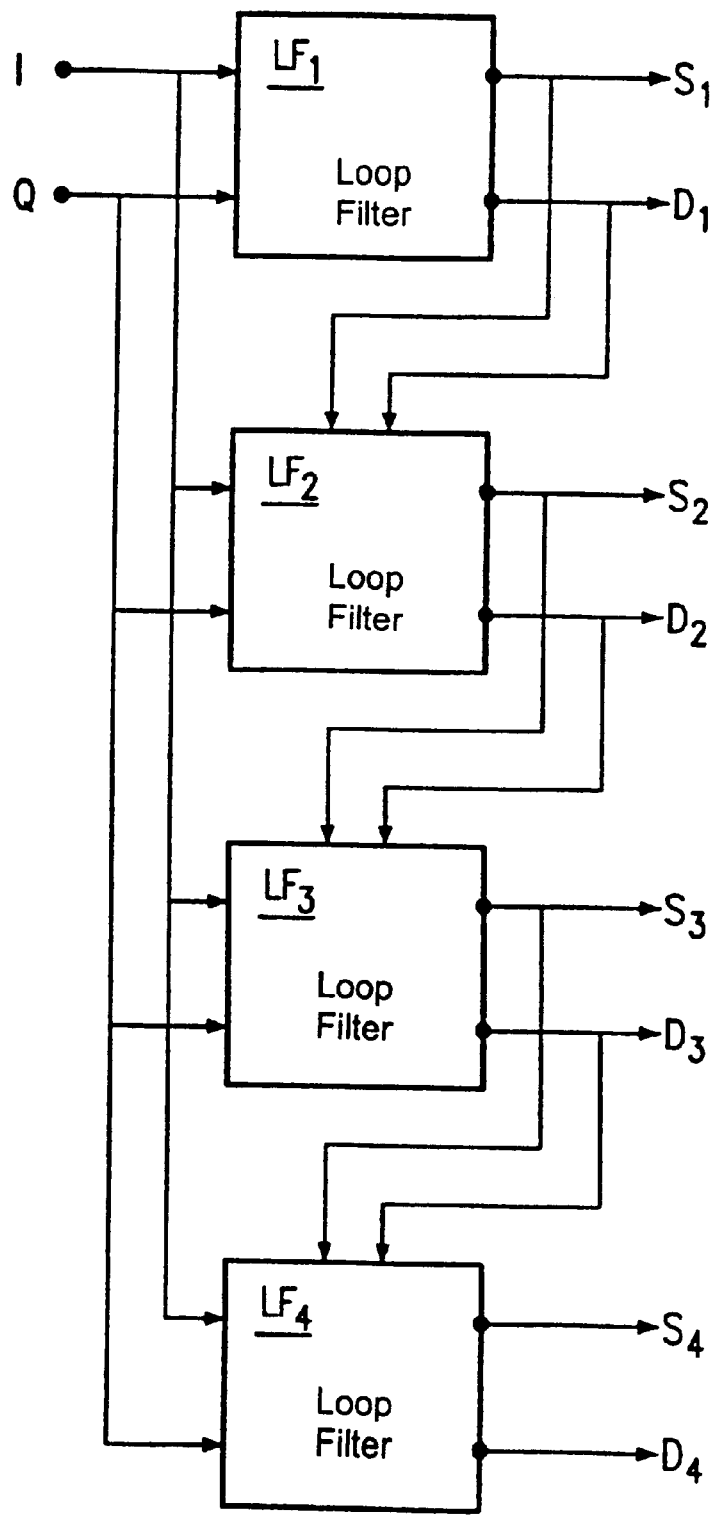
FIG. 2 is a block diagram with hierarchically staggered control loops according to the invention.

In the method according to the invention, four hierarchically staggered closed-loop controls including $LF_1$, $LF_2$, $LF_3$, $LF_4$ which in each case exhibit a second-order loop filter are used in the example shown in FIG. 2. The quadrature-demodulated spread spectrum signal sequence Q and the in-phase spread spectrum signal sequence I are supplied in parallel to the inputs of each closed-loop control $LF_1$ to $LF_4$. For each closed-loop control $LF_1$ to $LF_4$, different early/late intervals are set. An important prerequisite which must be adhered to is that the early/late interval $2\Delta_k$ of a closed-loop control $LF_k$, in comparison with a closed-loop control $LF_{k-1}$ having the next larger early/late interval $2\Delta_{k-1}$, meets the following conditions: $\Delta_k \geq \Delta_{k-1}/2$. The leading and respectively lagging phase shifts of the individual control loops $LF_1$, $LF_2$, $LF_3$ and $LF_4$ are $\pm\Delta_1 = Tc/2, \pm\Delta_2 = Tc/4, \pm\Delta_3 = Tc/8$ and $\pm\Delta_4 = Tc/16$.

Since second-order filters are used, each control loop $LF_1$ to $LF_4$ exhibits a pair of signal outputs $S_1$, $D_1$ to $S_4$, $D_4$ at which the delay (D) and the speed (S) can be picked up.

The control loop $LF_1$ having the largest early/late interval operates independently. Its outputs are connected to the inputs of the control loop $LF_2$ having the next smaller early/late interval, where the magnitudes of the two control loops are compared with one another. In the same manner, the outputs of the second control loop $LF_2$ are connected to the inputs of the control loop $LF_3$ having the next smaller early/late interval etc.

Figure 3:
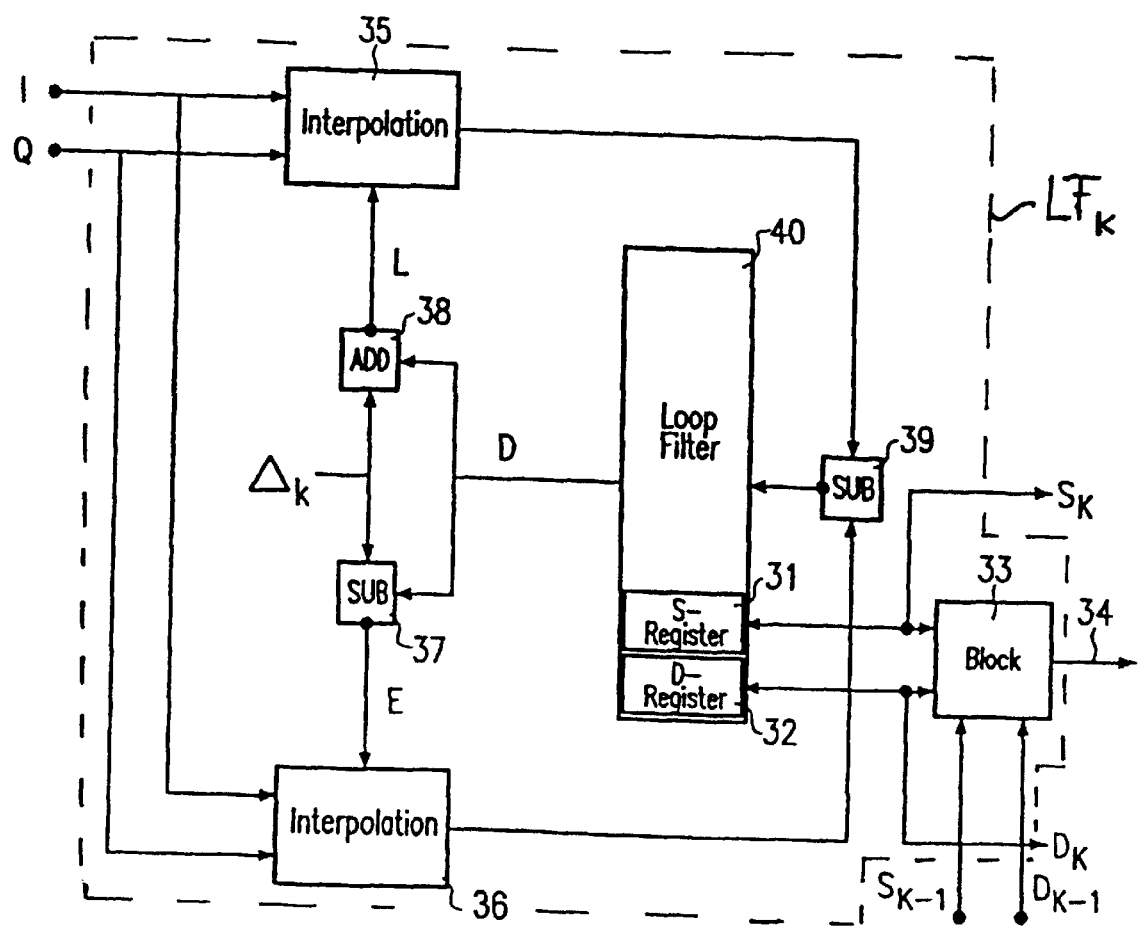
FIG. 3 is a block diagram of a control loop according to FIG. 2.

As illustrated in FIG. 3, the output signals ($S_k$ and $D_k$) generated in each control loop $LF_1$ to $LF_4$, which are temporarily stored in an S register 31 and a D register 32, are compared in this control loop $LF_1$ to $LF_4$ with the output signals which are supplied from the configuration according to FIG. 2. The comparison is performed in a comparator 33 the output of which is connected to a data processing unit 40 (see FIG. 4) via a line 34.

FIG. 3 illustrates as further components of the control loops $LF_1$ to $LF_4$ two interpolation units 35, 36 at which the input signals I, Q are present and which are required, as a function of the sampling rate, to increase the resolution, if necessary. The desired early and, respectively, late interval is applied to the interpolation units 35, 36 via a subtractor 37 or, respectively, an adder 38 which is set with the desired phase shift ($\Delta_k$ in the present example). The control loop is completed by a subtractor 39 for subtracting the output signals of the two interpolation units 35, 36 and to act upon a second-order loop filter 40 which, on the one hand, acts upon the subtractor 37 and the adder 38 and, on the other hand, establishes the contents of the S register 31 and the D register 32.

Figure 4:
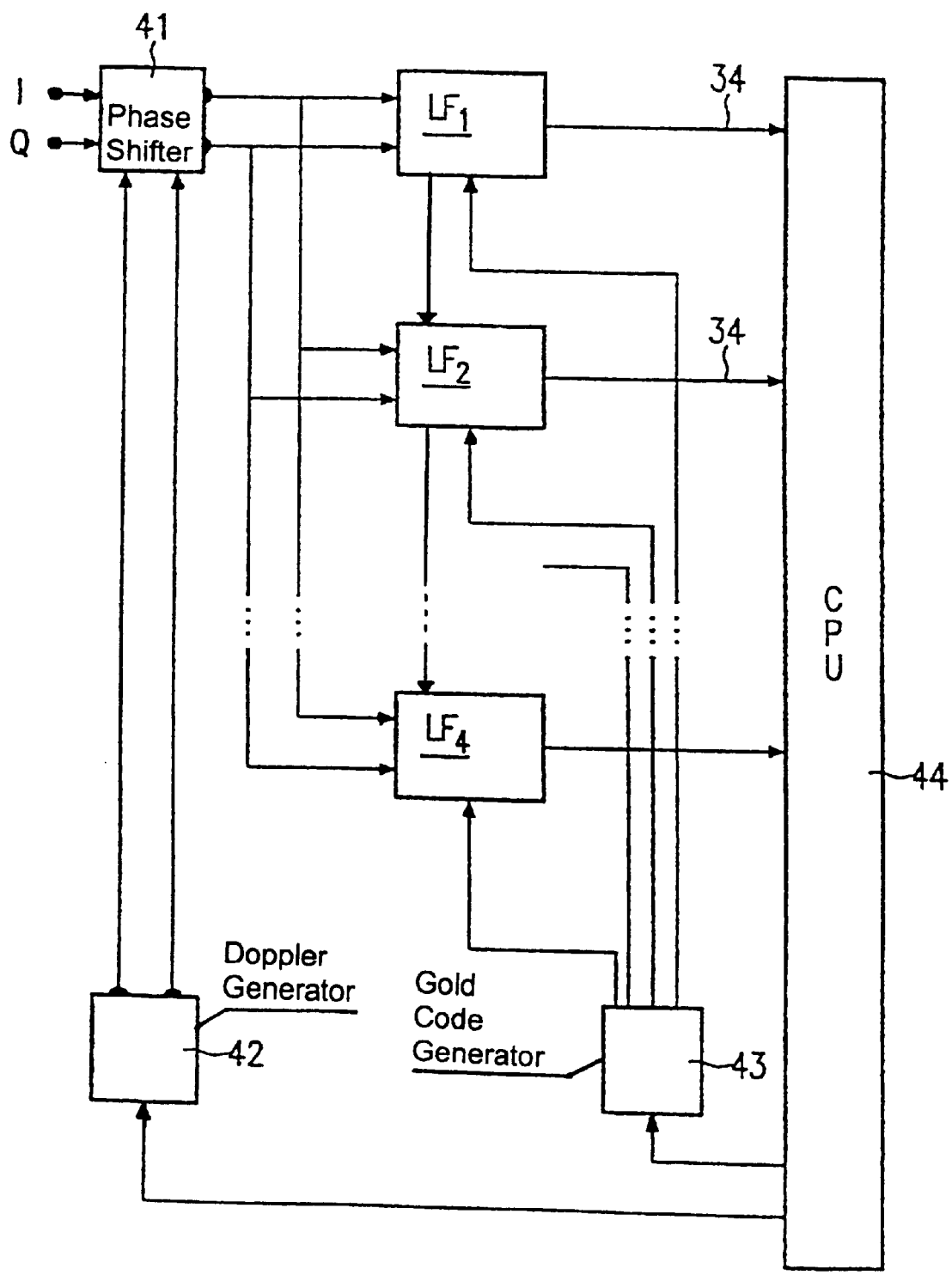
FIG. 4 is a block diagram of the closed-loop control configuration according to the invention.

FIG. 4 shows a block diagram of the overall hierarchically staggered closed-loop control with a phase shifter 41 at the input, a Doppler generator 42 controlled by the data processing unit 44, a gold code generator 43 and the four control loops $LF_1$ to $LF_4$.

Figures 5A, 5B:
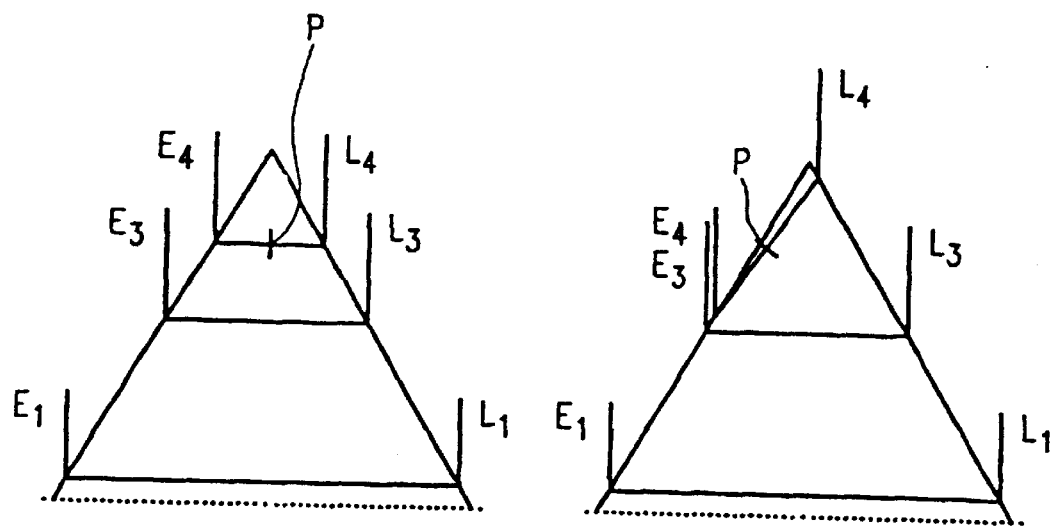
FIGS. 5a and 5b are graphical illustrations which in each case show an example of a correlation result as output signals of the closed-loop controls according to FIG. 2.

In the text which follows, the operation of this hierarchically staggered closed-loop control configuration is explained with reference to FIG. 5a on a typical example in which "normal" conditions are used as a basis. FIG. 5a illustrates the correlation response of the overall configuration which is ideally represented as a triangular curve. In this configuration, the early/late intervals $E_1$, $L_1$; $E_2$, $L_2$ ... $E_4$, $L_4$ of the four control loops $LF_1$ to $LF_4$ are reproduced. The control loop $L_4$ having the smallest early/late interval is used for evaluating the punctual time.

In the example according to FIG. 5b, the closed-loop control $LF_4$ having the smallest early/late interval may possibly lose lock in a highly dynamic scenario or with a very noisy input signal.

Before this can happen, the closed-loop control $LF_4$ having the smallest early/late interval is limited by the limits of the closed-loop control $LF_3$ having the next-larger early/late interval etc. Due to being limited, the closed-loop control $LF_4$ having the smallest early/late interval is used as the determining closed-loop control for calculating the punctual time. In FIG. 5a and FIG. 5b, the punctual time, which is in the center between $E_4$ and $L_4$, is designated by P.

We claim:

1. A method of tracking a locally generated spread spectrum signal sequence, the method which comprises:
   correlating a received spread spectrum signal sequence with the locally generated spread spectrum signal sequence with respect to a synchronization time at a relatively earlier time and a relatively later time in an early and late interval, respectively, thereby generating correlation responses;
   subtracting the correlation responses from one another;
   controlling a clock of the locally generated spread spectrum signal sequence as a function of a result of the subtracting step for synchronizing the locally generated spread spectrum signal sequence with the received spread spectrum signal sequence corresponding to the locally generated spread spectrum signal sequence; and
   performing correlations based on at least two hierarchically staggered closed-loop controls with different early and late intervals, wherein an early interval of a first one of the at least two hierarchically staggered closed-loop controls has a relatively smaller early and late interval such that the early interval of the first one of the at least two hierarchically staggered closed-loop controls does not become earlier than an early interval of a second one of the at least two hierarchically staggered closed-loop controls having a relatively next-larger early and late interval, and wherein a late interval of the first one of the at least two hierarchically staggered closed-loop controls is such that the late interval of the first one of the at least two hierarchically staggered closed-loop controls does not become later than a late interval of the second one of the at least two hierarchically staggered closed-loop controls.

2. The method according to claim 1, which comprises:

performing the correlations by starting with a largest one of the early and late intervals; and performing the correlations with a given one of the early and late intervals smaller than the largest one of the early and late intervals subsequent to reaching a control limit of the largest one of the early and late intervals.

3. The method according to claim 1, which comprises using an early time and a late time of a given one of the at least two hierarchically staggered closed-loop controls having a smallest one of the early and late intervals for calculating a punctual time.

4. A configuration for tracking a locally generated spread spectrum signal sequence, comprising:

a delay locked loop configuration including at least two control loops, each control loop correlating a locally generated early spread spectrum signal sequence and a locally generated late spread spectrum signal sequence with a received spread spectrum signal sequence;

said at least two control loops having different early and late intervals and having respective inputs for inputting the received spread spectrum signal sequence, said at least two control loops being connected in parallel at said respective inputs;

said at least two control loops including a first control loop and a second control loop, said first control loop having a first output and having a relatively smaller early and late interval, said second control loop having a second output and having a relatively next-larger early and late interval;

a comparator, connected to said first output and to said second output, for comparing output signals from said first control loop and said second control loop; and a data processing unit connected to said comparator.

5. The configuration according to claim 4, wherein said at least two control loops include four control loops.

6. The configuration according to claim 4, including further comparators each connected to a respective pair of said at least two control loops.

7. The configuration according to claim 4, wherein said at least two control loops are second-order control loops.

8. The configuration according to claim 4, wherein said first control loop and said second control loop are configured such that a relation $\Delta_k \geq \Delta_{k-1}/2$ is met, where $2\Delta_k$ is the relatively smaller early and late interval and $2\Delta_{k-1}$ is the relatively next-larger early and late interval.

9. The configuration according to claim 4, wherein a given one of said at least two control loops has a relatively largest early and late interval such that a relation $2\Delta_1 = T_c$ is met where $2\Delta_1$ is the relatively largest early and late interval and $T_c$ is a chip period of one of the spread spectrum signal sequences.

10. A method of tracking a locally generated spread spectrum signal sequence, the method which comprises:

correlating a received spread spectrum signal sequence with the locally generated spread spectrum signal sequence with respect to a synchronization time at a relatively earlier time and a relatively later time in an early and late interval using at least two hierarchically staggered closed-loop controls with different early and late intervals, wherein an early interval of a first one of the at least two hierarchically staggered closed-loop controls has a relatively smaller early and late interval such that the early interval of the first one of the at least two hierarchically staggered closed-loop controls does not become earlier than an early interval of a second one of the at least two hierarchically staggered closed-loop controls having a relatively next-larger early and late interval, and wherein a late interval of the first one of the at least two hierarchically staggered closed-loop controls is such that the late interval of the first one of the at least two hierarchically staggered closed-loop controls does not become later than a late interval of the second one of the at least two hierarchically staggered closed-loop controls;

subtracting correlation responses from one another; and controlling a clock of the locally generated spread spectrum signal sequence as a function of a result of the subtracting step for synchronizing the locally generated spread spectrum signal sequence with the received spread spectrum signal sequence corresponding to the locally generated spread spectrum signal sequence.

11. The method according to claim 10, which comprises:

performing the correlations by starting with a largest one of the early and late intervals; and performing the correlations with a given one of the early and and late intervals smaller than the largest one of the early/late intervals subsequent to reaching a control limit of the largest one of the early and late intervals.

12. The method according to claim 10, which comprises using an early time and a late time of a given one of the at least two hierarchically staggered closed-loop controls having a smallest one of the early and late intervals for calculating a punctual time.

* * * * *